(12) United States Patent
Andrea et al.

(10) Patent No.: US 7,650,224 B2
(45) Date of Patent: Jan. 19, 2010

(54) APPARATUS, SYSTEM, AND METHOD FOR REDUCING NITROGEN OXIDE EMISSIONS IN A COMBUSTION ENGINE

(75) Inventors: Morgan Andrea, Columbus, IN (US); Adrian Dale, Columbus, IN (US); Jeffrey A. Matthew, Columbus, IN (US); Vivek A. Sujan, Columbus, IN (US)

(73) Assignee: Cummins, Inc, Columbus, IN (US)

( * ) Notice: Subject to any disclaimer, the term of this patent is extended or adjusted under 35 U.S.C. 154(b) by 150 days.

(21) Appl. No.: 12/036,770

(22) Filed: Feb. 25, 2008

(65) Prior Publication Data

US 2009/0211229 A1 Aug. 27, 2009

(51) Int. Cl.
*F02D 21/08* (2006.01)
*F02D 35/02* (2006.01)
*F02D 43/00* (2006.01)

(52) U.S. Cl. .......................... 701/108; 701/110; 60/274

(58) Field of Classification Search ................ 701/108, 701/109, 102, 110; 60/274, 276, 285; 477/98, 477/100, 110
See application file for complete search history.

(56) References Cited

U.S. PATENT DOCUMENTS

| | | | | |
|---|---|---|---|---|
| 4,120,214 A * | 10/1978 | Toda et al. | ................... | 477/98 |
| 4,214,037 A | 7/1980 | Galasso et al. | ............... | 428/367 |
| 4,446,840 A | 5/1984 | Nakagawa et al. | .......... | 123/571 |
| 5,682,864 A | 11/1997 | Shirakawa | | |
| 6,356,831 B1 * | 3/2002 | Michelini et al. | ............. | 701/56 |
| 6,612,291 B2 | 9/2003 | Sakamoto | ................... | 123/492 |
| 6,662,553 B2 | 12/2003 | Patchett et al. | ................. | 60/286 |
| 6,700,213 B1 | 3/2004 | Wakashiro et al. | ............ | 290/40 |
| 6,755,176 B2 | 6/2004 | Takeuchi et al. | | |
| 6,832,148 B1 | 12/2004 | Bennett et al. | ................. | 701/54 |
| 6,910,329 B2 | 6/2005 | Bunting et al. | ................ | 60/297 |
| 6,944,532 B2 | 9/2005 | Bellinger | .................... | 701/115 |
| 6,945,905 B2 | 9/2005 | Tamai et al. | .................... | 477/3 |

FOREIGN PATENT DOCUMENTS

| | | |
|---|---|---|
| EP | 1 001 153 | 11/1999 |
| EP | 1255031 A2 | 11/2002 |
| EP | 1 143 724 | 10/2003 |
| JP | 60-060298 | 4/1985 |

OTHER PUBLICATIONS

PCT/US2009/035157 International Search and Written Opinion, Aug. 11, 2009.

* cited by examiner

*Primary Examiner*—Hieu T Vo
(74) *Attorney, Agent, or Firm*—Kunzler & McKenzie

(57) ABSTRACT

An apparatus, system, and method are disclosed for reducing nitrogen oxide emissions in a combustion engine. The method includes a shift detection module determining an out of gear (OOG) indicator for a manual transmission. The method further includes an engine speed module determining an engine speed target based on at least one operating condition of the engine. The method continues with a load determination module determining an engine load target in response to the OOG indicator and an engine acceleration module determining a desired net torque based on the engine speed target and the engine load target. Finally, the method concludes with an emissions module determining a minimum fuel target based on the desired net torque and an actuation module generating a fueling signal to engage an engine fueling.

25 Claims, 6 Drawing Sheets

APPARATUS, SYSTEM, AND METHOD FOR REDUCING NITROGEN OXIDE EMISSIONS IN A COMBUSTION ENGINE

FIELD

This invention relates to methods for reducing nitrogen oxide emissions and more particularly relates to reducing nitrogen oxide emissions for an engine coupled to a manual transmission.

BACKGROUND

Reducing environmentally harmful emissions from internal combustion engines is an ongoing challenge for engine designers. Present and future federal emission standards continue to demand lower emissions for undesirable byproducts of combustion such as soot and nitrogen oxides. Methods for reducing harmful emissions are well known in the art and include thermal management of exhaust gas to reduce formation of nitrogen oxides ($NO_X$) during temperature spikes, and thermal management of exhaust gas to ensure burn off (regeneration) of aftertreatment devices downstream of an exhaust outlet. Known emissions reducing devices and systems include aftertreatment devices such as soot filters to remove particulates from the exhaust gases, and exhaust gas recirculation (EGR) to lower the oxygen fraction of intake air impeding molecular combinations of nitrogen with surplus oxygen that may form $NO_X$.

Although various known methods and devices may answer many of the challenges associated with controlling the release of undesirable emissions, other application specific and circumstantial specific challenges remain unsolved. For example, under steady state operating conditions, $NO_X$ emissions for a diesel engine with a manual transmission appear similar to $NO_X$ emissions for a diesel engine using an automatic transmission. However, immediately following periods of gear transition, such as during acceleration, the diesel engine with the manual transmission exhibits $NO_X$ emission spikes not seen with the diesel engine coupled to the automatic transmission. The diesel engine coupled to the automatic transmission avoids $NO_X$ emissions spikes due to the rapid and substantially smooth transitions between gears associated with automatic transmissions, which acts to maintain a load on the engine. The maintained load results in continuing fuel injection, which supports a proper EGR flow and maintains the beneficial oxygen fraction in the intake air.

In contrast to automatic transmissions, engaging the clutch of the manual transmission during gear transitions releases the load from the engine. In response to releasing the load from the engine, the engine may reduce fueling altogether, thereby substantially increasing the oxygen content of the recirculated exhaust and thus raising the oxygen fraction of intake air. When the load is placed back on the engine, air with a relatively high oxygen fraction combusts with reintroduced fuel, which results in high combustion temperatures. Before the engine can achieve a more preferable EGR flow and oxygen fraction (e.g., when the engine reengages the vehicle load by a release of the clutch), the excess oxygen combined with higher exhaust temperatures results in a spike of $NO_X$ emissions. Accordingly, the interconnected and delicate balance of preserving fuel economy, meeting acceptable exhaust outlet temperature ranges, maintaining optimal oxygen fraction in the intake air, and generating sufficient air flows in the engine is further complicated and encumbered by the application of the manual transmission.

Though manual transmissions may provide an economical option for consumers, manual transmissions are known to exhibit specific emissions challenges compared to automatic transmissions during periods of gear transition. $NO_X$ spikes immediately following transition periods may be so severe with manual transmissions that some manufactures of combustion engines may forego the more economical option of the manual transmissions in favor of more expensive and emissions predictable automatic transmissions.

SUMMARY

From the foregoing discussion, it should be apparent that a need exists for an apparatus, system, and method that reduces nitrogen oxide emissions for a combustion engine coupled to a manual transmission. Beneficially, such an apparatus, system, and method would reduce $NO_X$ emissions spikes while transitioning between gears of a manual transmission.

The present invention has been developed in response to the present state of the art, and in particular, in response to the problems and needs in the art that have not yet been fully solved by currently available methods. Accordingly, various embodiments of the present invention have been developed to provide an apparatus, system, and method for reducing nitrogen oxide emissions that may overcome many or all of the above-discussed shortcomings in the art.

According to one embodiment, an apparatus is disclosed for reducing nitrogen oxide emissions in a combustion engine. The apparatus comprises a shift detection module configured to determine an out of gear (OOG) indicator, and an emissions module configured to set a minimum fuel target in response to the OOG indicator. The minimum fuel target may be based on an exhaust gas recirculation (EGR) flow rate requirement and an EGR oxygen fraction requirement. The apparatus further includes an engine speed module configured to determine an engine speed target based on an engine deceleration profile, and an engine acceleration module configured to determine a desired net torque based on the engine speed target. The engine speed module may be configured to determine the engine speed target such that the engine speed and the manual transmission speed are substantially synchronized when a gear of the manual transmission is engaged.

In some implementations of the apparatus, a load determination module is further included to determine an engine load target based on the desired net torque and a base fueling. Finally, an actuation module generates an engine load signal to engage an engine load based on the engine load target. Engaging the engine load may include engaging a compression brake, a fan clutch, an alternator (and/or other electrical device), a hydraulic retarder, an exhaust flow restriction, and a variable geometry turbocharger. The engine load may be a variable engine load such as the compression brake comprising a variable number of engageable cylinders. In certain implementations, the EGR oxygen fraction requirement is a function of a current EGR flow rate. Those of skill in the art will recognize that many other devices in given applications of the present invention may be beneficial for loading the engine.

In another embodiment, a system is disclosed for reducing nitrogen oxide emissions in an internal combustion engine. The system includes an engine mechanically coupled to a manual transmission producing an exhaust flow, and an exhaust gas recirculation (EGR) system returning a portion of the exhaust flow to an air intake of the engine. The system includes a controller for reducing nitrogen oxide emissions. The controller may comprise the shift detection module, the emissions module, the engine speed module, the engine acceleration module, the load determination module, and the actuation module. In one embodiment the system may include an internal combustion electric hybrid engine. Engaging the engine load may include engaging an alternator clutch coupled to an alternator. The alternator provides an electrical charge to at least one battery and/or other electrical device.

In certain implementations of the system, engaging the engine load comprises engaging at least one engine load selected from the group consisting of engaging a compression brake, a fan clutch, an alternator clutch, a hydraulic retarder, an exhaust flow restriction, a flywheel, and a variable geometry turbocharger. In other implementations, the engine speed module is further configured to determine the engine speed target such that the engine speed and the manual transmission speed are substantially synchronized when a gear of the manual transmission is engaged According to yet another embodiment, a method of the present invention is also presented for reducing nitrogen oxide emissions in a combustion engine. The method in the disclosed embodiments substantially includes the steps necessary to carry out the functions presented above with respect to the operation of the described apparatus and system. The method includes determining the out of gear (OOG) indicator based on whether a rate of change in an apparent gear ratio exceeds a threshold. In an alternate embodiment determining the OOG indicator may comprise interpreting a manual transmission clutch sensor signal. One of skill in the art will recognize that interpreting signals from other suitable devices to determine the OOG indicator is within the scope of the present invention. The method continues by determining the minimum fuel target in response to the OOG indicator. The minimum fuel target may be based on an exhaust gas recirculation (EGR) flow rate requirement and an EGR oxygen fraction requirement. In a further embodiment the engine comprises a predetermined load with the fueling based on the predetermined load. The method further includes determining the engine speed target based on an engine deceleration profile, and determining the desired net torque based on the engine speed target. The method continues by determining the engine load target based on the desired net torque and a base fueling, generating the engine load signal based on the engine load target, and finally engaging a compression brake comprising the engine load. In a given embodiment of the present invention the method may conclude by engaging an engine load comprising at least one of an electrical, hydraulic, and/or mechanical device.

In an alternate embodiment a further method is disclosed for reducing nitrogen oxide emissions in a combustion engine. The method comprises determining the out of gear (OOG) indicator, determining the minimum fuel target, determining the engine speed target, determining the desired net torque, determining the engine load target, and generating the engine load signal.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the features, advantages, and characteristics described herein may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
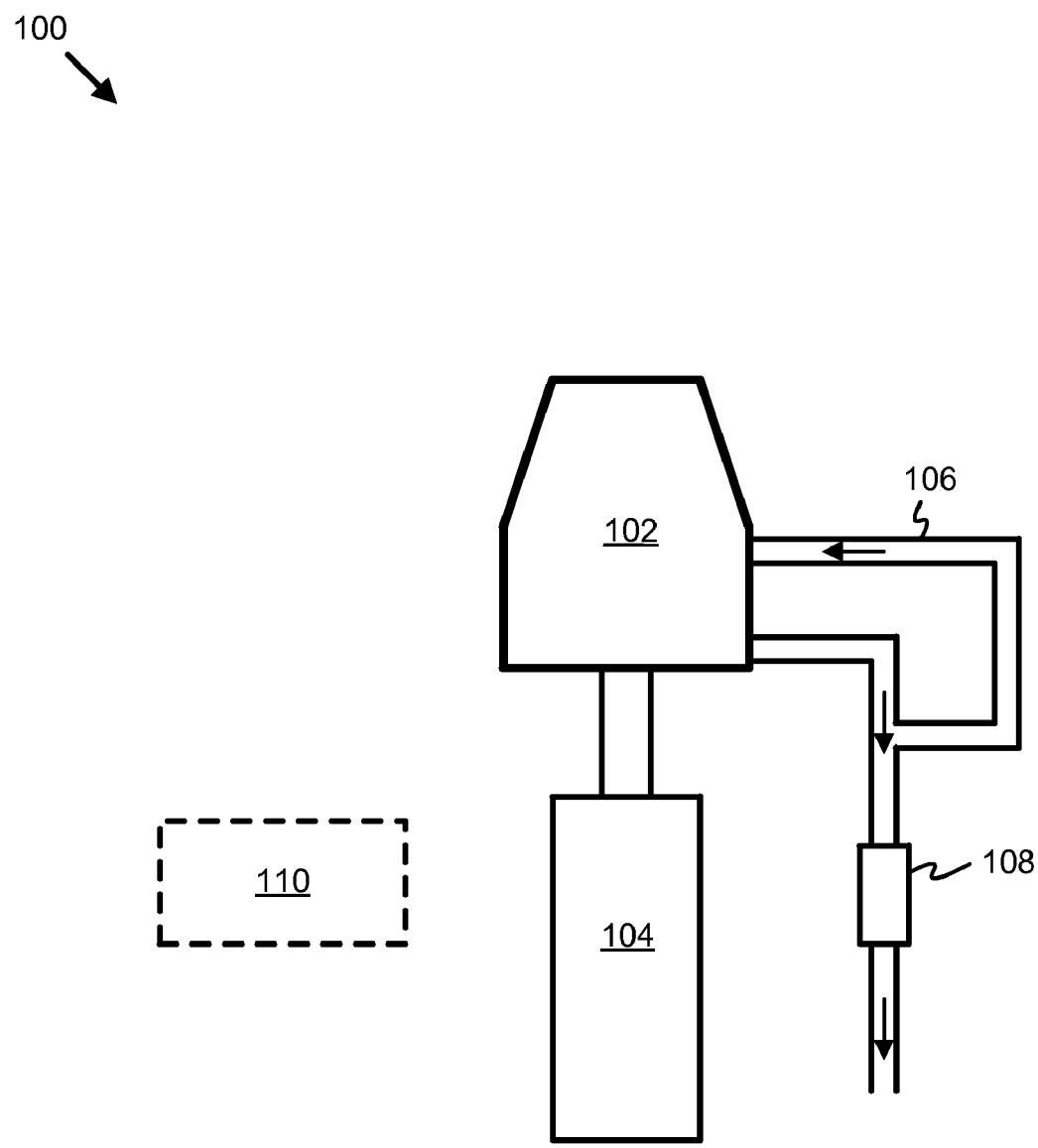
FIG. 1 is a schematic illustration depicting one embodiment of a system for reducing nitrogen oxide emissions in a combustion engine in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic illustration depicting one embodiment of a system 100 for reducing nitrogen oxide emissions in a combustion engine in accordance with the present invention. The system 100 comprises an internal combustion engine 102 producing an exhaust flow. The engine 102 is mechanically coupled to a manual transmission 104. The system 100 may further comprise an exhaust gas recirculation (EGR) system 106 returning a portion of the exhaust flow to an air intake of the engine 102. The system 100 further comprises a controller 110 for reducing nitrogen oxide emissions. The controller 110 may be configured to interpret a set of operating conditions and determine a response for the combustion engine 102.

The controller 110 may be in communication with various components, actuators, sensors, and/or datalinks of the engine 102 including the manual transmission 104, an exhaust flow restriction 108, a network backbone, an engine control module (ECM), and/or any other device beneficial for determining an operating state of the engine 102, and/or advantageous for controlling aspects of the engine 102. The controller 110 may be configured to engage at least one engine load, such as engaging a compression brake, a fan clutch, an alternator clutch, a hydraulic retarder, the exhaust flow restriction 108, a variable geometry turbocharger (VGT), and/or other device capable of producing a load on the engine 102. In one example a clutch may comprise a viscous clutch comprising a variable load. The exhaust flow restriction 108 may comprise a VGT, a butterfly valve, and/or any other type of variable restriction 108 beneficial for providing load for the engine. For example, the variable restriction 108 may generate a backpressure on the engine 102 generating engine load.

The controller 110 may further determine an out of gear (OOG) indicator, an engine speed target, a desired net torque, a minimum fuel target, and an engine load target. The controller 110 may be configured to generate an engine load signal to engage an engine load. The controller 110 may comprise modules including a shift detection module 202, an engine speed module 214, an emissions module 207, an engine acceleration module 220, a load determination module 224, and an actuation module 230 (see FIG. 2A). In a contemplated embodiment of the system 100, the engine 102 may comprise an internal combustion electric hybrid engine 102. Engaging the engine load for the hybrid engine may comprise engaging an alternator clutch coupled to an alternator. The alternator may thereby provide an electrical charge to at least one battery and/or other electrical device coupled to the internal combustion electric hybrid engine.

Figure 2A:
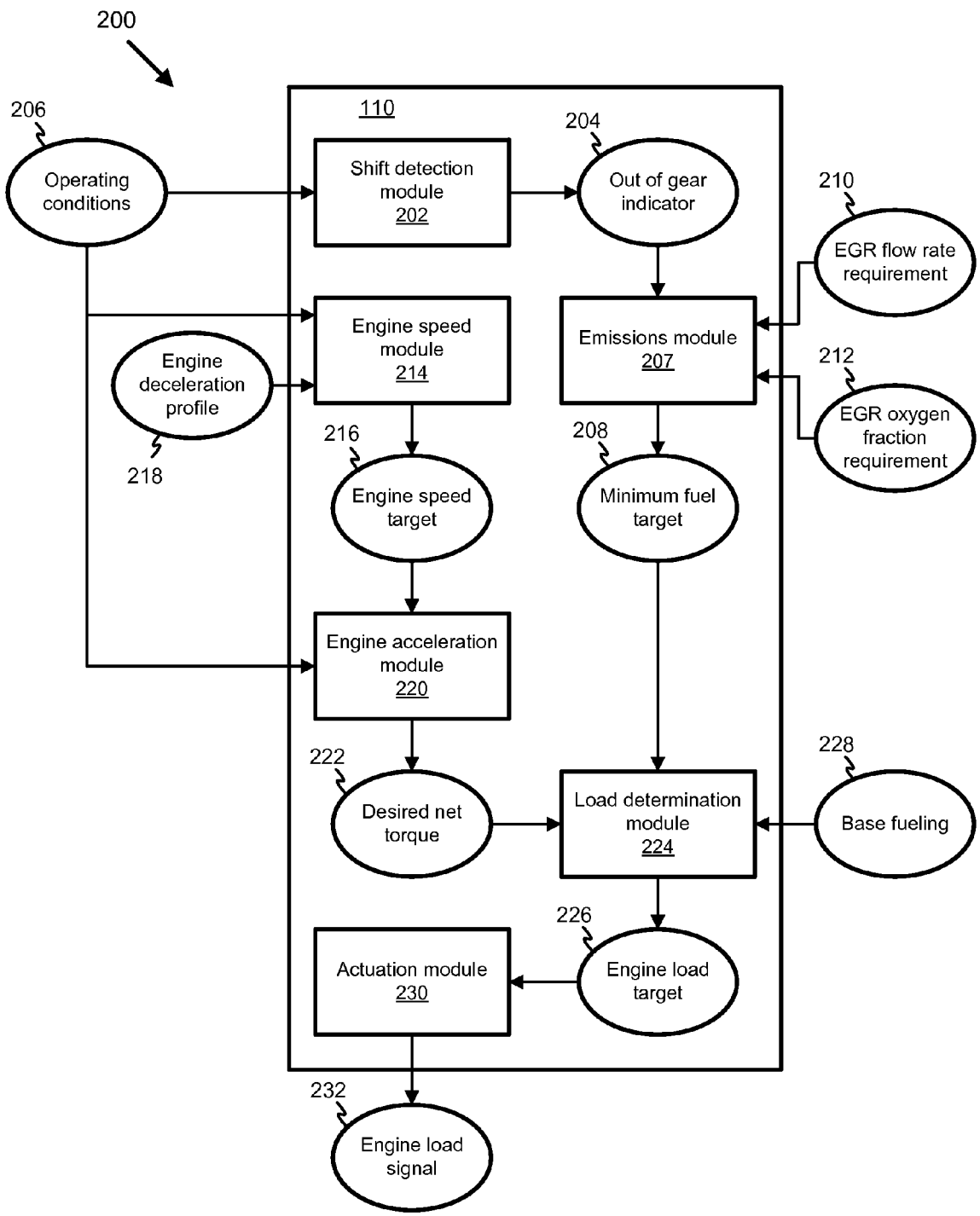
FIG. 2A is a schematic block diagram illustrating one embodiment of an apparatus for reducing nitrogen oxide emissions in a combustion engine in accordance with the present invention.

FIG. 2A is a schematic block diagram illustrating one embodiment of an apparatus 200 for reducing nitrogen oxide emissions in a combustion engine 102 in accordance with the present invention. In one embodiment, the controller 110 comprises the apparatus 200. The apparatus 200 comprises the shift detection module 202 configured to determine the OOG indicator 204. The shift detection module 202 may determine the OOG indicator 204 based on interpreting at least one operating condition 206. For example, the shift detection module 202 may be configured to determine the OOG indicator 204 based on determining a rate of change of a ratio between a wheel speed of a vehicle and an engine speed.

In an alternate embodiment, the shift detection module 202 may be configured to determine the OOG indicator 204 by determining a rate of change of a ratio between a transmission tailshaft speed and the engine speed. In yet another example, the shift detection module 202 may be configured to determine the OOG indicator 204 by determining whether a rate of change of an apparent gear ratio exceeds a threshold. The shift detection module 202 may further determine the OOG indicator 204 by reading a parameter from a datalink. For example, the manual transmission 104 can be a smart transmission that publishes a gear ratio and the OOG indicator 204 to a network in communication with the shift detection module 202. In a further embodiment, the shift detection module 202 may determine the OOG indicator 204 by detecting a target engine speed. In a further embodiment, the shift detection module 202 may determine the OOG indicator 204 by determining a clutch pedal position.

The controller 110 may interpret other operating conditions 206, which may include any combination of an engine speed, a wheel speed of a vehicle, a clutch pedal position, an exhaust gas recirculation (EGR) flow rate, an oxygen fraction of the EGR, a gear prediction, a battery charge level, a coolant temperature, the OOG condition, the gear to which the vehicle may be changing, a preferred engine load, a preferred engine speed, a preferred fueling of the engine 102, and any other operating condition beneficial for a particular application of the present invention. For example, a specific fueling of the engine may be required to achieve a certain oxygen fraction in the EGR 106, which may result in a required engine load to support air flow through the EGR 106. In a further example, a specific load may be applied to the engine 102 requiring the adjustment of fueling such that a target engine speed may be achieved and/or maintained.

The apparatus 200 further comprises the emissions module 207 configured to set a minimum fuel target 208 in response to the OOG indicator 204. The minimum fuel target 208 may be further based on an EGR flow rate requirement 210 and an EGR oxygen fraction requirement 212. For example, to prevent the formation of nitrogen oxides during gear shift cycles when a vehicle user is generally not requesting fuel through the depression of the accelerator, it may be beneficial to support EGR flow and oxygen fraction with a certain minimum amount of fueling. In one embodiment, the EGR oxygen fraction requirement 212 comprises a function of a current EGR flow rate.

The apparatus 200 further comprises the engine speed module 214 configured to determine an engine speed target 216 based on an engine deceleration profile 218. Methods of determining the engine deceleration profile are known in the art. One of skill in the art may implement the most beneficial method for determining the engine deceleration profile 218. For example, the engine deceleration profile 218 may be determined by examining engine decelerations of a vehicle user stored on the controller 110, an engine control module (ECM), and/or any other device suitable for recording a history of engine decelerations of the vehicle user. In an alternate example, the engine deceleration profile 218 may be determined by predicting a gear ratio that a vehicle user may be changing to and reading a corresponding engine deceleration profile 218 from a look-up table stored on the controller 110. In a further example, a load may be applied to the engine 102 such that an increase in fueling is required to maintain a target engine speed consistent with an anticipated gear ratio and a sensed vehicle speed.

In one embodiment of the present invention, the engine speed module 214 may be further configured to determine the engine speed target 216 such that the engine speed and the manual transmission speed are substantially synchronized when a gear of the manual transmission 104 is engaged. For example a tailshaft speed of the manual transmission may be synchronized with the engine speed. In an alternate embodiment, synchronizing the manual transmission 104 speed to the engine speed may comprise referencing a standard deceleration profile of the engine 102.

The apparatus 200 further comprises the engine acceleration module 220 configured to determine a desired net torque 222 based on the engine speed target 216. The desired net torque 222 may be based on any combination of a minimum amount of fueling required, the inertial mass of the engine 102, and a required engine load. One of skill in the art may determine the necessary parameters for a particular application to determine the desired net torque 222. In one example, the engine acceleration module 220 may calculate a fuel to torque conversion for the particular application such that an amount of fuel may comprise a given amount of torque.

In a further example, the engine acceleration module 220 may determine an apparent inertial mass of the engine 102. In one instance, the engine acceleration module 220 may configure the desired net torque 222 to increase the deceleration of the engine 102. In another instance, the engine acceleration module 220 may reduce the desired net torque 222 to reduce the rate of deceleration of the engine 102. For example, the engine acceleration module 222 may increase or decrease the rate of engine deceleration via the desired net torque 222 as a means to synchronize the engine speed to a speed of the transmission tailshaft.

The apparatus 200 further comprises the load determination module 224 configured to determine an engine load target 226 based on the desired net torque 222 and a base fueling 228. In one embodiment, the base fueling 228 may comprise one of the operating conditions 206. In one example, the base fueling 228 may comprise the minimum amount of fueling required to maintain the operation of the engine 102 during periods of low work load such as when the engine is idling. Additional fueling may be required in some examples to support necessary additional loads such as operating an air conditioner. The engine load target 226 may comprise an amount of engine load required to support an amount of fueling to the engine 102 such that a sufficient EGR flow and/or oxygen fraction is maintained to assist in the prevention of the formation of nitrogen oxides. In another example, the engine load target 226 may comprise an additional required engine load such as the load required for engaging an alternator to provide an electrical charge to a battery and/or other electrical device.

The apparatus 200 may further comprise the actuation module 230 configured to generate an engine load signal 232 to engage an engine load based on the engine load target 226. Engaging the engine load may comprise engaging at least on engine load selected from the group consisting of engaging a compression brake, a fan clutch, an alternator clutch, a hydraulic retarder, an exhaust flow restriction, a variable geometry turbocharger (VGT), and/or other external load beneficial for a given embodiment of the present invention. In one embodiment, engaging the engine load comprises engaging a variable engine load based on the desired net torque 222. For example, engaging the compression brake may comprise engaging a variable number of cylinders based on the desired net torque 222. In an alternate embodiment, engaging the engine load comprises engaging one of a high engine load and a low engine load. For example, the high engine load may comprise engaging the compression brake and the low engine load may comprise engaging the fan clutch.

Figure 2B:
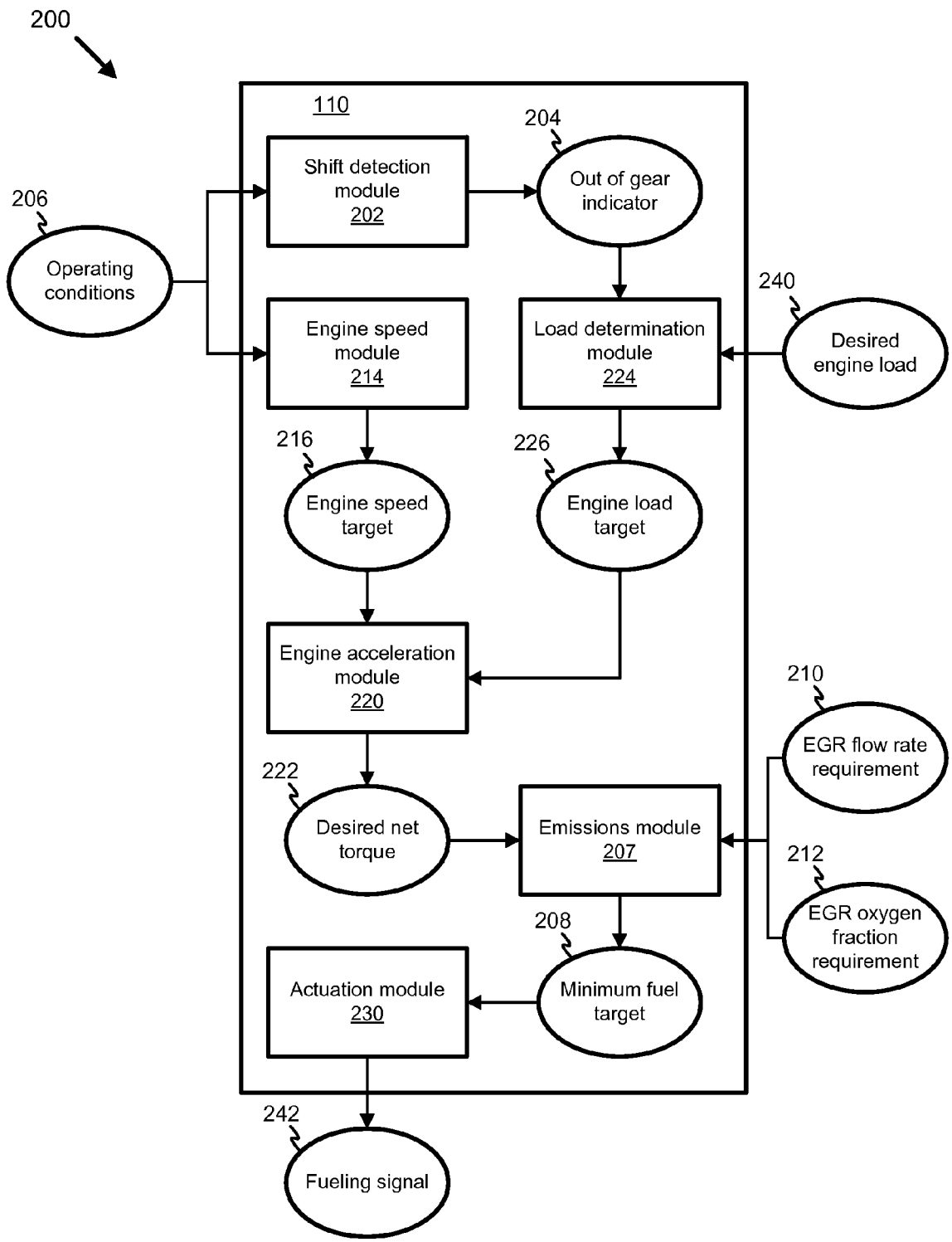
FIG. 2B is a schematic block diagram illustrating an alternate embodiment of an apparatus for reducing nitrogen oxide emissions in a combustion engine in accordance with the present invention.

FIG. 2B is a schematic block diagram illustrating an alternate embodiment of an apparatus 200 for reducing nitrogen oxide emissions in a combustion engine 102 in accordance with the present invention. Wherein FIG. 2A depicts an embodiment of the present invention where a desired base fueling 228 may determine the required engine load target 226 to be placed on the engine, FIG. 2B shows a further alternate embodiment where a desired engine load 240 may determine the minimum fuel target 208 required for the given engine load 240, and the actuation module 230 may alternatively generate a fueling signal 242 to engage a fueling of the engine 102. One of skill in the art may determine an optimum configuration of modules, with corresponding inputs and outputs, for a given application of the present invention based on the disclosures herein.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
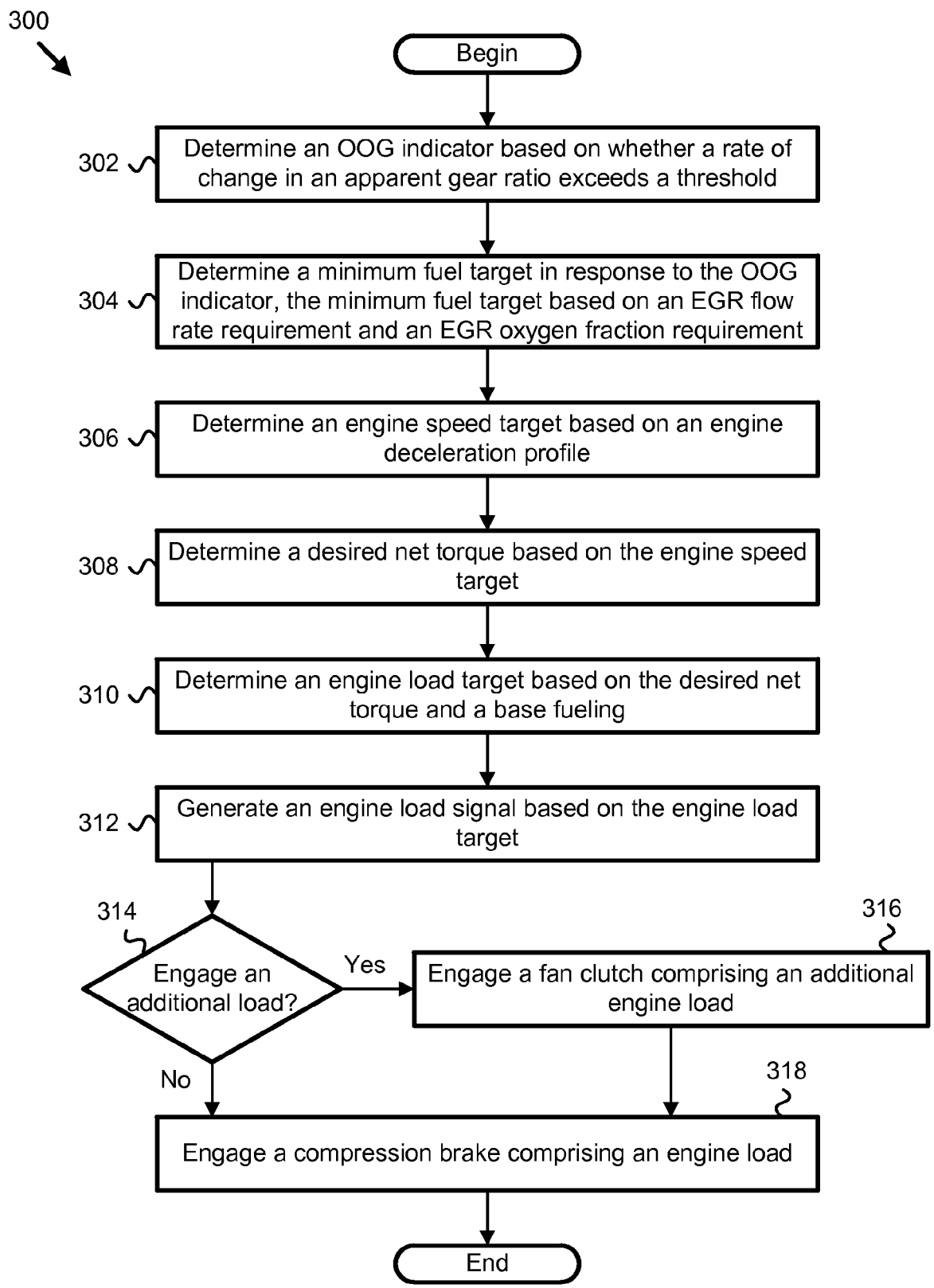
FIG. 3 is a schematic flow chart diagram illustrating one embodiment of a method for reducing nitrogen oxide emissions in a combustion engine in accordance with the present invention.

FIG. 3 is a schematic flow chart diagram illustrating one embodiment of a method 300 for reducing nitrogen oxide emissions in the combustion engine 102 in accordance with the present invention. The method 300 begins with the shift detection module 202 determining 302 the OOG indicator based on whether a rate of change in an apparent gear ratio exceeds a threshold. The method 300 continues with the emissions module 207 determining 304 a minimum fuel target in response to the OOG indicator. In one embodiment, the minimum fuel target may be based on an EGR flow rate requirement 210 and an EGR oxygen fraction requirement 212. For example, the EGR flow rate requirement 210 and the EGR oxygen fraction requirement 212 may comprise requirements necessary to limit the amount of nitrogen oxide formation during shift cycles of the engine.

In one embodiment, the method further includes the engine speed module 214 determining 306 the engine speed target based on the engine deceleration profile. The method continues with the engine acceleration module 220 determining 308 the desired net torque based on the engine speed target, and the load determination module 224 determining the engine load target based on the desired net torque and a base fueling. The method further includes the actuation module 230 generating 312 the engine load signal based on the engine load target. In one embodiment, the method 300 may include checking whether to engage 314 an additional load. In one example, a coolant temperature may be higher than a threshold value and the method may therefore include engaging 316 a fan clutch comprising the additional engine load. The method may conclude by engaging 318 the compression brake comprising the engine load.

Figure 4:
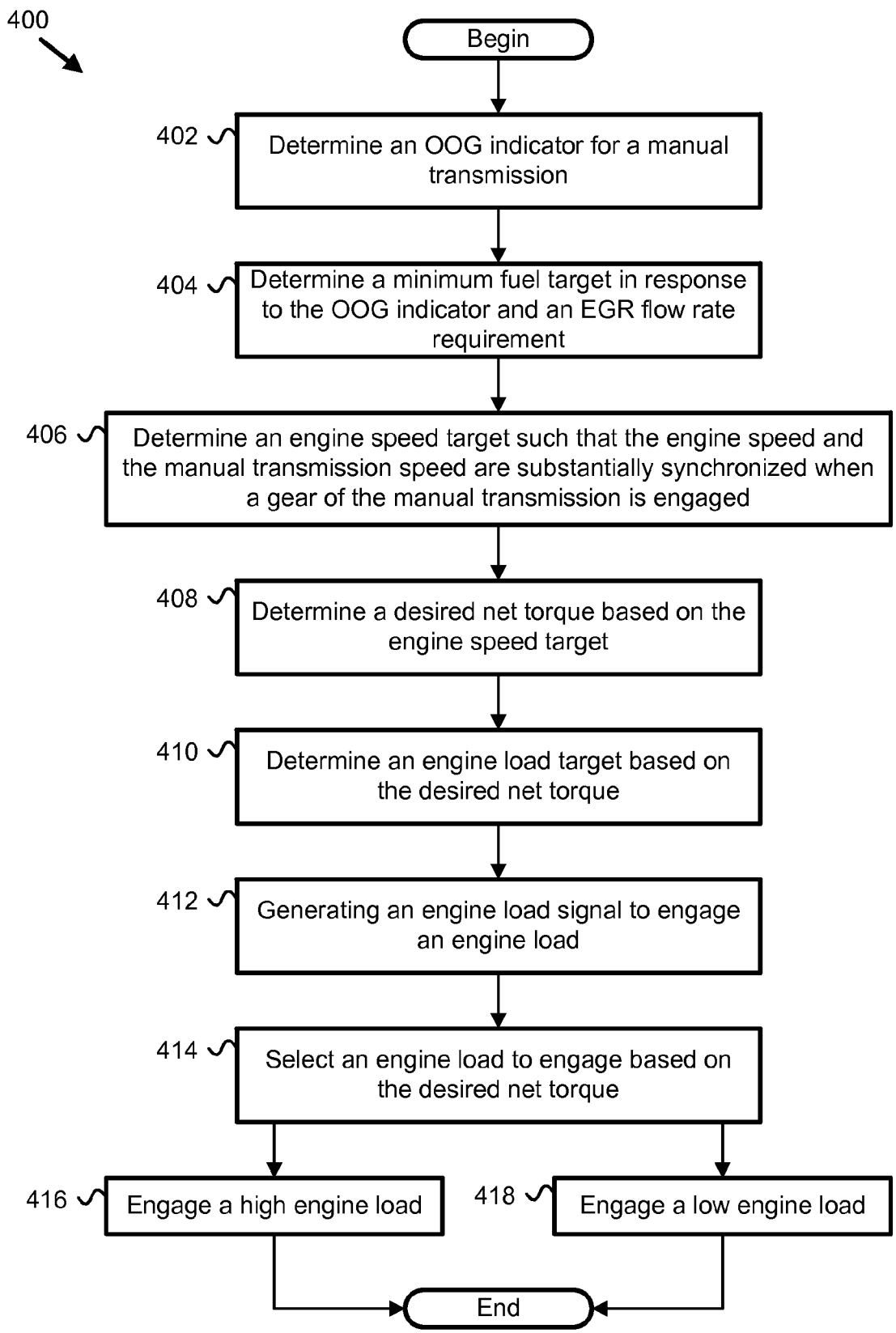
FIG. 4 is a schematic flow chart diagram illustrating an alternate embodiment of a method for reducing nitrogen oxide emissions in accordance with the present invention.

FIG. 4 is a schematic flow chart diagram illustrating an alternate embodiment of a method 400 for reducing nitrogen oxide emissions in accordance with the present invention. The method begins by the shift detection module 202 determining 402 the OOG indicator for the manual transmission, and the emissions module 207 further determining 404 the minimum fuel target in response to the OOG indicator and the EGR flow rate requirement. In one embodiment, the method 400 includes the engine speed module 214 determining 406 the engine speed target such that the engine speed and the manual transmission speed are substantially synchronized when a gear of the manual transmission is engaged. The method 400 continues with the engine acceleration module 220 determining 408 the desired net torque based on the engine speed target, the load determination module 224 determining 410 the engine load target based on the desired net torque, and the actuation module 230 generating 412 the engine load signal to engage an engine load. In one embodiment, the method may further include selecting 414 the engine load to engage based on the desired net torque. For example, the method 400 may engage 416 a high engine load or engage 418 a low engine load.

Figure 5:
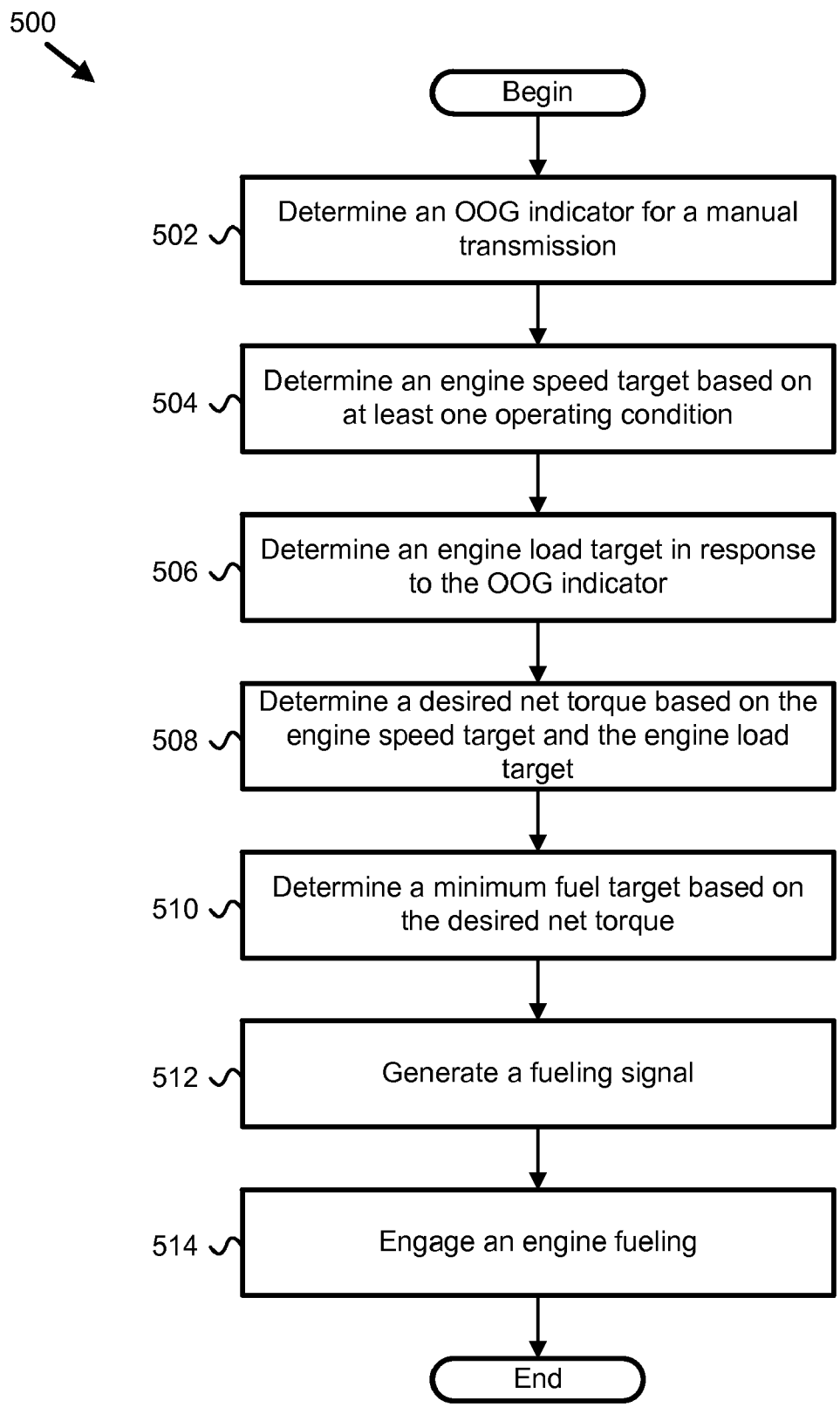
FIG. 5 is a schematic flow chart diagram illustrating a further embodiment of a method for reducing nitrogen oxide emissions in accordance with the present invention.

FIG. 5 is a schematic flow chart diagram illustrating a further embodiment comprising a method 500 for reducing nitrogen oxide emissions in accordance with the present invention. The method 500 comprises the shift detection module 202 determining 502 the OOG indicator for the manual transmission and the engine speed module 214 determining 504 the engine speed target based on at least one operating condition. The load determination module 224 may determine 506 the engine load target in response to the OOG indicator, and the engine acceleration module 220 may determine 508 the desired net torque based on the engine speed target and the engine load target. The method 500 concludes by the emissions module 207 determining 510 the minimum fuel target based on the desired net torque, and the actuation module 230 alternatively generating 512 a fueling signal to engage 514 an engine fueling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for reducing nitrogen oxide emissions in a combustion engine, the apparatus comprising:
    a shift detection module configured to determine an out of gear (OOG) indicator;
    an emissions module configured to set a minimum fuel target in response to the OOG indicator, the minimum fuel target further based on an exhaust gas recirculation (EGR) flow rate requirement and an EGR oxygen fraction requirement;
    an engine speed module configured to determine an engine speed target based on an engine deceleration profile;
    an engine acceleration module configured to determine a desired net torque based on the engine speed target;
    a load determination module configured to determine an engine load target based on the desired net torque and a base fueling; and
    an actuation module configured to generate an engine load signal to engage an engine load based on the engine load target.

2. The apparatus of claim 1, wherein engaging the engine load comprises engaging at least one engine load selected from the group consisting of engaging a compression brake, a fan clutch, an alternator clutch, a hydraulic retarder, an exhaust flow restriction, a flywheel, and a variable geometry turbocharger.

3. The apparatus of claim 1, wherein engaging the engine load comprises engaging a variable engine load based on the desired net torque.

4. The apparatus of claim 1, wherein engaging the engine load comprises engaging one of a high engine load and a low engine load.

5. The apparatus of claim 1, wherein the engine speed module is further configured to determine the engine speed target such that the engine speed and the manual transmission speed are substantially synchronized when a gear of the manual transmission is engaged.

6. The apparatus of claim 1, wherein the engine speed module is further configured to determine the engine speed target based on meeting a predetermined engine deceleration profile.

7. A system for reducing nitrogen oxide emissions in an internal combustion engine, the system comprising:
    an engine producing an exhaust flow, the engine mechanically coupled to a manual transmission;
    an exhaust gas recirculation (EGR) system returning a portion of the exhaust flow to an air intake of the engine;
    a controller for reducing nitrogen oxide emissions, the controller comprising:
        a shift detection module configured to determine an out of gear (OOG) indicator;
        an emissions module configured to set a minimum fuel target in response to the OOG indicator, the minimum fuel target further based on an exhaust gas recirculation (EGR) flow rate requirement and an EGR oxygen fraction requirement;

an engine speed module configured to determine an engine speed target based on an engine deceleration profile;

an engine acceleration module configured to determine a desired net torque based on the engine speed target;

a load determination module configured to determine an engine load based on the desired net torque and a base fueling; and an actuation module configured to generate an engine load signal to engage an engine load based on the engine load target.

8. The system of claim 7, wherein the engine comprises an internal combustion electric hybrid engine, and wherein engaging the engine load comprises engaging an alternator clutch coupled to an alternator, the alternator thereby providing an electrical charge to at least one battery of the internal combustion electric hybrid engine.

9. The system of claim 7, wherein the shift detection module determines the OOG indicator based on determining a rate of change of a ratio between a wheel speed of a vehicle and an engine speed.

10. The system of claim 7, wherein the shift detection module determines the OOG indicator by determining a rate of change of a ratio between a transmission tailshaft speed and an engine speed.

11. The system of claim 7, wherein the shift detection module is further configured to determine the OOG indicator by determining whether a rate of change of an apparent gear ratio exceeds a threshold.

12. The system of claim 7, wherein the shift detection module is further configured to determine the OOG indicator by reading a parameter from a datalink.

13. The system of claim 7, wherein the shift detection module is further configured to determine the OOG indicator by interpreting a clutch pedal position signal.

14. A method for reducing nitrogen oxide emissions in a combustion engine, the method comprising:

determining an out of gear (OOG) indicator based on whether a rate of change in an apparent gear ratio exceeds a threshold;

determining a minimum fuel target in response to the OOG indicator, the minimum fuel target based on an exhaust gas recirculation (EGR) flow rate requirement and an EGR oxygen fraction requirement;

determining an engine speed target based on an engine deceleration profile;

determining a desired net torque based on the engine speed target;

determining an engine load target based on the desired net torque and a base fueling;

generating an engine load signal based on the engine load target; and engaging a compression brake comprising the engine load.

15. The method of claim 14, wherein engaging the compression brake further comprises engaging an additional load selected from the group consisting of engaging a fan clutch, an alternator clutch, a hydraulic retarder, an exhaust flow restriction, and a variable geometry turbocharger.

16. The method of claim 14, wherein engaging the compression brake further comprises engaging a variable number of cylinders of the engine for the compression brake.

17. The method of claim 14, wherein determining that the manual transmission is OOG comprises comparing a current engine deceleration with a predefined engine deceleration profile.

18. A method for reducing nitrogen oxide emissions in a combustion engine, the method comprising:

determining an out of gear (OOG) indicator for a manual transmission;

determining an engine speed target based on at least one operating condition;

determining an engine load target in response to the OOG indicator;

determining a desired net torque based on the engine speed target and the engine load target;

determining a minimum fuel target based on the desired net torque; and generating a fueling signal to engage an engine fueling.

19. The method of claim 18, wherein engaging the engine load comprises engaging at least one engine load selected from the group consisting of engaging a compression brake, a fan clutch, an alternator clutch, a flywheel, a hydraulic retarder, an exhaust flow restriction, and a variable geometry turbocharger.

20. The method of claim 19, wherein engaging the compression brake comprises engaging a variable number of cylinders of an engine for the compression brake based on the engine speed target.

21. The method of claim 18, wherein engaging the engine load comprises engaging a variable engine load based on the engine speed target.

22. The method of claim 18, wherein engaging the engine load comprises engaging one of a high engine load and a low engine load.

23. The method of claim 18, wherein determining the engine speed target comprises determining the engine speed target such that the engine speed and the manual transmission speed are substantially synchronized when a gear of the manual transmission is engaged.

24. The method of claim 18, wherein determining the engine speed target comprises determining the engine speed target based on meeting a predetermined engine deceleration profile.

25. The method of claim 18, wherein determining the minimum fuel target further comprises determining the minimum fuel target based on at least one of an EGR flow rate requirement and an EGR oxygen fraction requirement.

* * * * *